US012558785B2

(12) United States Patent
Song et al.

(10) Patent No.: US 12,558,785 B2
(45) Date of Patent: Feb. 24, 2026

(54) ROBOT AND METHOD FOR AUTONOMOUSLY MOVING AND GRASPING OBJECTS

(71) Applicant: National Yang Ming Chiao Tung University, Hsinchu (TW)

(72) Inventors: Kai-Tai Song, New Taipei (TW); Chien-Wei Chiu, New Taipei (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 144 days.

(21) Appl. No.: 18/384,377

(22) Filed: Oct. 26, 2023

(65) Prior Publication Data

US 2024/0316767 A1    Sep. 26, 2024

(30) Foreign Application Priority Data

Mar. 21, 2023   (TW) .................................. 112110436
Jun. 29, 2023   (TW) .................................. 112124363

(51) Int. Cl.
B25J 9/16            (2006.01)
(52) U.S. Cl.
CPC ........... B25J 9/1664 (2013.01); B25J 9/1612 (2013.01); B25J 9/162 (2013.01); B25J 9/163 (2013.01); B25J 9/1697 (2013.01)
(58) Field of Classification Search
CPC ........ B25J 9/1664; B25J 9/1612; B25J 9/162; B25J 9/163; B25J 9/1697
See application file for complete search history.

(56) References Cited

U.S. PATENT DOCUMENTS

| | | | |
|---|---|---|---|
| 9,785,911 B2 | 10/2017 | Galluzzo et al. | |
| 10,875,187 B2 * | 12/2020 | Paquin ................... | B25J 9/1692 |
| 11,033,338 B2 | 6/2021 | Sugie et al. | |
| 11,878,419 B2 * | 1/2024 | Gonzalez Aguirre ...................... | B25J 19/023 |
| 2018/0161986 A1 * | 6/2018 | Kee ........................ | G06V 20/10 |
| 2019/0248003 A1 * | 8/2019 | Nagarajan ................ | B25J 9/163 |

(Continued)

OTHER PUBLICATIONS arXiv:1811.11431v3 by âMehtaâ; title: âESPNetv2: A Light-weight, Power Efficient, and General Purpose Convolutional Neural Networkâ (Year: 2019).*

(Continued)

*Primary Examiner* — Sohana Tanju Khayer

(57) ABSTRACT

A robot and method for autonomously moving and grasping objects are provided. The robot includes a robotic arm for grasping a target object; a mobile platform for moving the robotic arm to the target object's location; a semantic navigation system for navigating the mobile platform to the target object's location; a first camera for shooting the external environment during navigation; a second camera for obtaining relative images of the environment for the robotic arm; an object recognition and pose estimation system for performing semantic segmentation and pose estimation of the target object; an automatic docking coordination controller for obtaining the best mobile grasping path and pose for the robotic arm and the mobile platform; a mobile grasping controller for controlling the movement of the robotic arm through the object recognition and pose estimation system; and a mobile platform controller for controlling the motion of the robot.

8 Claims, 10 Drawing Sheets

(56) References Cited

U.S. PATENT DOCUMENTS

| | | | | |
|---|---|---|---|---|
| 2019/0337152 A1* | 11/2019 | Homberg | ............... | B25J 9/1697 |
| 2020/0241574 A1* | 7/2020 | Lin | ...................... | G05D 1/0088 |
| 2020/0262064 A1* | 8/2020 | Claussen | ................ | B25J 9/1669 |
| 2020/0324409 A1* | 10/2020 | Gonzalez Aguirre | ....................... | |
| | | | | B25J 9/1661 |
| 2020/0361083 A1* | 11/2020 | Mousavian | ............ | G06N 3/063 |
| 2021/0122045 A1* | 4/2021 | Handa | .................... | B25J 13/084 |
| 2021/0138655 A1* | 5/2021 | Mousavian | ............ | B25J 9/1666 |
| 2022/0121837 A1* | 4/2022 | Cesic | ........................ | G05D 1/69 |
| 2022/0161427 A1* | 5/2022 | Yerazunis | .............. | B25J 9/1674 |
| 2022/0309672 A1* | 9/2022 | Cherian | ................. | G06N 3/045 |
| 2023/0081119 A1* | 3/2023 | Rohanimanesh | ...... | B25J 9/1653 |
| | | | | 700/250 |
| 2023/0116896 A1* | 4/2023 | Hamilton | ............... | B25J 9/1666 |
| | | | | 701/50 |
| 2023/0169675 A1* | 6/2023 | Tang | ......................... | G06T 7/12 |
| | | | | 382/103 |
| 2023/0267614 A1* | 8/2023 | Cherian | ................... | G06T 7/50 |
| | | | | 700/259 |
| 2023/0415943 A1* | 12/2023 | Marseglia | .............. | G06V 10/70 |
| 2024/0009851 A1* | 1/2024 | Mousavian | ............ | B25J 9/1697 |
| 2024/0091950 A1* | 3/2024 | Hong | ......................... | G06T 7/50 |
| 2024/0198526 A1* | 6/2024 | Aparicio Ojea | ....... | B25J 9/1669 |
| 2024/0198530 A1* | 6/2024 | Ugalde Diaz | .......... | B25J 9/1679 |
| 2024/0208069 A1* | 6/2024 | Aparicio Ojea | ....... | B25J 9/1605 |
| 2025/0028300 A1* | 1/2025 | Balzer | ................... | G06V 10/82 |

OTHER PUBLICATIONS arXiv:1901.04780v1 by âWangâ; title: âDenseFusion: 6D Object Pose Estimation by Iterative Dense Fusionâ (Year: 2019).*

Kai-Tai Song et al., Object-Oriented Navigation with a Multi-layer Semantic Map, May 2022, pp. 1386-1391.

Emilia Brzozowska et al., A Generic Optimization Based Cartesian Controller for Robotic Mobile Manipulation, May 2019, pp. 2054-2060.

Shanshan Zhu et al., A Robotic Semantic Grasping Method for Pick-and-place Tasks, 2019, pp. 4130-4136.

* cited by examiner

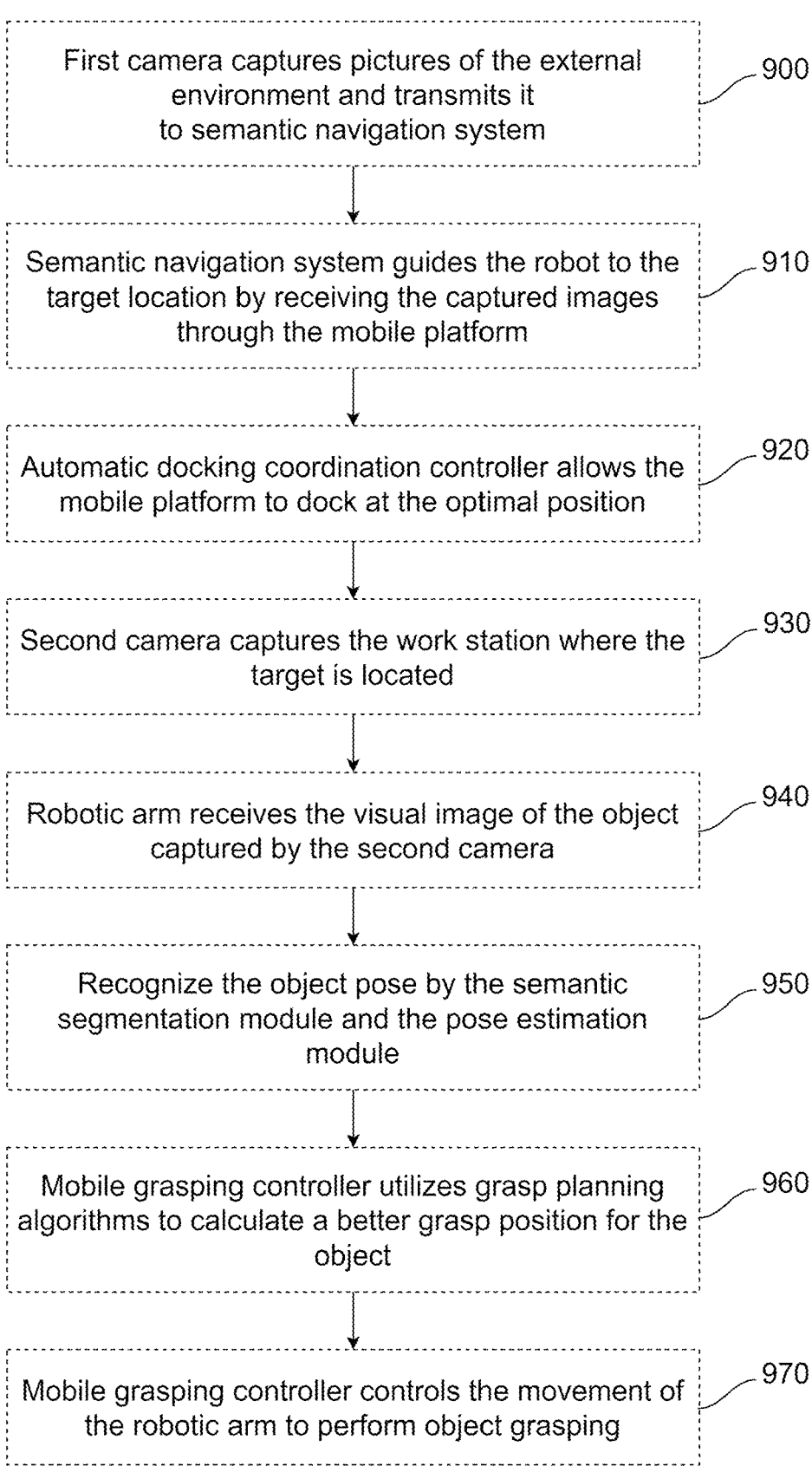

First camera captures pictures of the external environment and transmits it to semantic navigation system — 900

Semantic navigation system guides the robot to the target location by receiving the captured images through the mobile platform — 910

Automatic docking coordination controller allows the mobile platform to dock at the optimal position — 920

Second camera captures the work station where the target is located — 930

Robotic arm receives the visual image of the object captured by the second camera — 940

Recognize the object pose by the semantic segmentation module and the pose estimation module — 950

Mobile grasping controller utilizes grasp planning algorithms to calculate a better grasp position for the object — 960

Mobile grasping controller controls the movement of the robotic arm to perform object grasping — 970

Fig. 9

ROBOT AND METHOD FOR AUTONOMOUSLY MOVING AND GRASPING OBJECTS

CROSS-REFERENCE TO RELATED APPLICATION

This application claims the priority benefit of Taiwan application nos. 112110436, filed on Mar. 21, 2023, and 112124363, filed on Jun. 29, 2023, the full disclosure of which is incorporated herein by reference.

BACKGROUND

Technical Field

The present disclosure relates to a robotic arm capable of autonomously moving and grasping objects, which can be applied to the industries of robotic automation and intelligent manufacturing systems.

Description of Related Art

Issued U.S. Pat. No. 9,785,911B2, proposes a method and system for sorting or storing goods in logistics facilities using a central server and a robotic arm. The central server is configured to communicate with the robot to send and receive picking data. The robot can autonomously navigate and self-position within the logistics facility using at least one sensor from multiple sensors that can identify landmarks. The sensor also provides signals related to the detection, identification, and location of items to be picked up or stored. However, the disclosure is limited to locating known identifiers and lacks flexibility in application.

Issued U.S. Pat. No. 11,033,338B2, proposes an adaptive robotic arm grasp planning technique for cluttered stacking, analyzing the shape of the workpiece to identify multiple robust grasping options, each grasping option with a position and direction; and further analyzing the shape of the workpiece to determine multiple stable intermediate poses; evaluating each individual workpiece in the box to identify a feasible set of grasps. However, it only describes the approach for a single workpiece and does not provide a solution for different types of workpieces.

Published U.S. patent, US20180161986A1, discloses a system for semantic simultaneous tracking, object registration, and three-dimension (3D) mapping which can maintain a world map made of static and dynamic objects, rather than just 3D clouds of points. The patent also allows real-time learning of semantic attributes of objects, which can enhance the robot's navigation and localization capabilities. However, the patent only utilizes objects for navigation and does not discuss object grasping.

In the paper titled "Object-Oriented Navigation with a Multi-layer Semantic Map" by K. T. Song and L. Kang, presented at the 13th Asian Control Conference (ASCC 2022) in Jeju Island, Korea, pp. 1386-1391, this study proposes a navigation system of unmanned guided vehicles based on semantic map information. The system can perform semantic simultaneous localization and mapping (SLAM for short) in the workplace where the robot is to navigate, to generate the semantic SLAM map of the environment used to realize the semantic navigation task. However, the semantic information is only used for the navigation of the unmanned guided vehicle, and there is no grasping plan for the object.

In the paper titled "A Generic Optimization Based Cartesian Controller for Mechanical Mobile Manipulation" by E. Brzozowska, O. Lima and R. Ventura, presented in Proc. of 2019 International Conference on Robotics and Automation (ICRA), Montreal, QC, Canada, pp. 2054-2060, this study considers a robotic arm mounted on a mobile robot base and determines the optimal joint velocities of the arm and mobile platform given a three-dimensional target pose. This study focuses on the real-time closed-loop system architecture between the depth camera sensing, the robotic arm and mobile platform, but it does not take into account the demand for the robotic arm to dock.

In the paper titled "A Robotic Semantic Grasping Method For Pick-and-place Tasks" by S. Zhu, X. Zheng. M. Xu, Z. Zeng and H. Zhang, in Proc. of 2019 Chinese Automation Congress (CAC), Hangzhou, China, 2019, pp. 4130-4136, this study proposes a robot semantic grasping method to estimate the six degree of freedom (6-DOF) grasp pose of a robot. The method combines the object detection method of pixel-wise semantic segmentation with the processing method of point clouds to calculate the grasping configuration and realize the grasping perpendicular to the surface of the object. However, only grasping at the position of the centroid cannot meet the grasping requirements of all objects.

SUMMARY

A first aspect of this disclosure is to enable a robotic arm to autonomously complete grasping tasks in daily environments. Therefore, we hope to combine semantic information to allow the robot to understand the environment and improve grasping success rates through object pose estimation and grasp planning. By combining a mobile grasping controller, the robotic arm's pose and the mobile platform can simultaneously arrive at the grasping position to efficiently complete the task.

A second aspect of this disclosure is to optimize the motion of the robotic arm and mobile platform for robotic arm motion and grasping while considering the hardware limitations of the robotic arm and the docking position of the mobile platform.

A third aspect of this disclosure is to be applicable in the industries of robot automation and intelligent manufacturing systems, which can improve the flexibility of robots to meet the needs of flexible manufacturing systems, adapt to changing environments, and increase the working space of the robotic arm.

A fourth aspect of this disclosure is to be applicable in collaborative robots, industrial robots, and companion robots. Collaborative robots can share a work environment with workers to perform tasks and are easy to rewrite programs to respond to changes in the manufacturing process. Through this method, the robotic arm can move around these manufacturing units to perform tasks such as transporting finished products, semi-finished products, and automatic assembly.

To achieve the above aspects and other aspects, the present disclosure provides a robot and method for autonomously moving and grasping objects. The robot comprises a robotic arm for grasping a target object; a mobile platform carrying the robotic arm for moving the robotic arm to a location of the target object to be grasped; a semantic navigation system electrically connected to the mobile platform for navigating the mobile platform to the location of the target object; a first camera electrically connected to the semantic navigation system for shooting the external environment during navigation; a second camera for obtaining relative images of the environment for the robotic arm; an object recognition and pose estimation system electrically connected to the robotic arm for performing semantic recognition and segmentation as well as pose estimation of the target object to control the robotic arm's grasping of the target object through the second camera; an automatic docking coordination controller electrically connected to the robotic arm and the mobile platform for obtaining the best mobile grasping path and pose for both the robotic arm and the mobile platform through the object recognition and pose estimation system; a mobile grasping controller electrically connected to the robotic arm for controlling the movement of the robotic arm through the object recognition and pose estimation system to enable the robotic arm to dock at a better position for grasping; and a mobile platform controller electrically connected to the mobile platform for controlling the motion of the robot.

BRIEF DESCRIPTION OF THE DRAWINGS

In order to make the above and other purpose, features, advantages and embodiments of the present disclosure more obvious and understandable, the description of the accompanying drawings is as follows:

FIG. 9 is a flow chart of a method of autonomously grasping objects according to an embodiment of the present disclosure.

DETAILED DESCRIPTION

Figure 1:
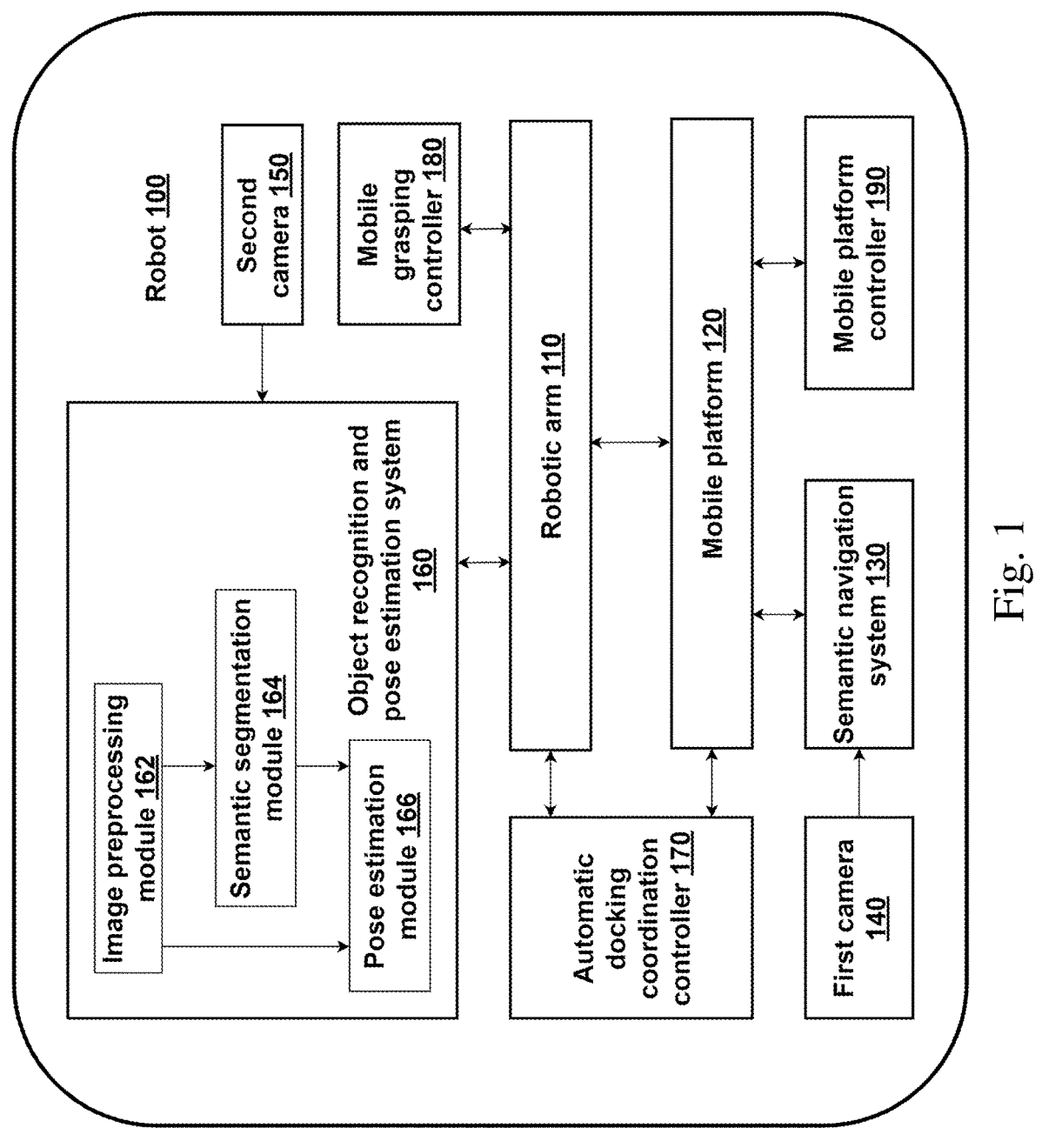
FIG. 1 is a module block diagram of a robot according to an embodiment of the present disclosure.

The present disclosure discloses a robot and method for autonomously moving and grasping objects. FIG. 1 is a module block diagram of a robot according to an embodiment of the present disclosure. In FIG. 1, the robot 100 comprises a robotic arm 110, a mobile platform 120, a semantic navigation system 130, a first camera 140, a second camera 150, an object recognition and pose estimation system 160, an automatic docking coordination controller 170, a mobile grasping controller 180, and a mobile platform controller 190.

The robotic arm 110 is used for grasping a target object. The mobile platform 120 carries the robotic arm 110 for moving the robotic arm 110 to a location of the target object to be grasped.

The semantic navigation system 130 is electrically connected to the mobile platform 120 for navigating the mobile platform 120 to the location of the target object. In an embodiment of this disclosure, the semantic navigation system 130 pre-builds a semantic map, allowing the robotic arm 110 to reach the location of the target object through the semantic map.

The first camera 140 is electrically connected to the semantic navigation system 130 for shooting the external environment during navigation. In an embodiment of this disclosure, the first camera 140 is a depth camera (i.e., an RGB-D camera) that provides high-quality synchronous video with both color and depth information.

The second camera 150 is for obtaining relative images of the environment for the robotic arm 110. In an embodiment of this disclosure, the second camera 150 is an eye-in-hand visual depth camera (i.e., an eye in hand RGB-D camera).

The object recognition and pose estimation system 160 is electrically connected to the robotic arm 110 and the second camera 150 for performing semantic recognition and segmentation as well as pose estimation of the target object to control the grasping of the target object by the robotic arm 110. The object recognition and pose estimation system 160 comprises an image preprocessing module 162, a semantic segmentation module 164, and a pose estimation module 166.

The image preprocessing module 162 is used for processing the images, such as RGB-D images, shoot by the second camera 150, serving as the preprocessing for depth images. The semantic segmentation module 164 is electrically connected to the image preprocessing module 162 for performing semantic segmentation on preprocessed RGB images. The pose estimation module 166 is electrically connected to both the image preprocessing module 162 and the semantic segmentation module 164 for estimating the pose and calculating the six degrees of freedom (6DOF) pose estimation results of objects after image preprocessing and semantic segmentation.

The automatic docking coordination controller 170 is electrically connected to the robotic arm 110 and the mobile platform 120 for obtaining the best mobile grasping path and pose for both the robotic arm 110 and the mobile platform 120.

The mobile grasping controller 180 is electrically connected to the robotic arm 110 for controlling the movement of the robotic arm 110 through the object recognition and pose estimation system 160 to enable the robotic arm 110 to dock at a better position for grasping. In an embodiment of this disclosure, the mobile grasping controller 180 applies a robotic arm grasp planning algorithm, and the grasp planning algorithm is divided into three parts: centroid and contour segment acquisition, grasp index design, and grasp pose transformation.

The mobile platform controller 190 is electrically connected to the mobile platform 120 for controlling the motion of the robot 100.

Figure 2:
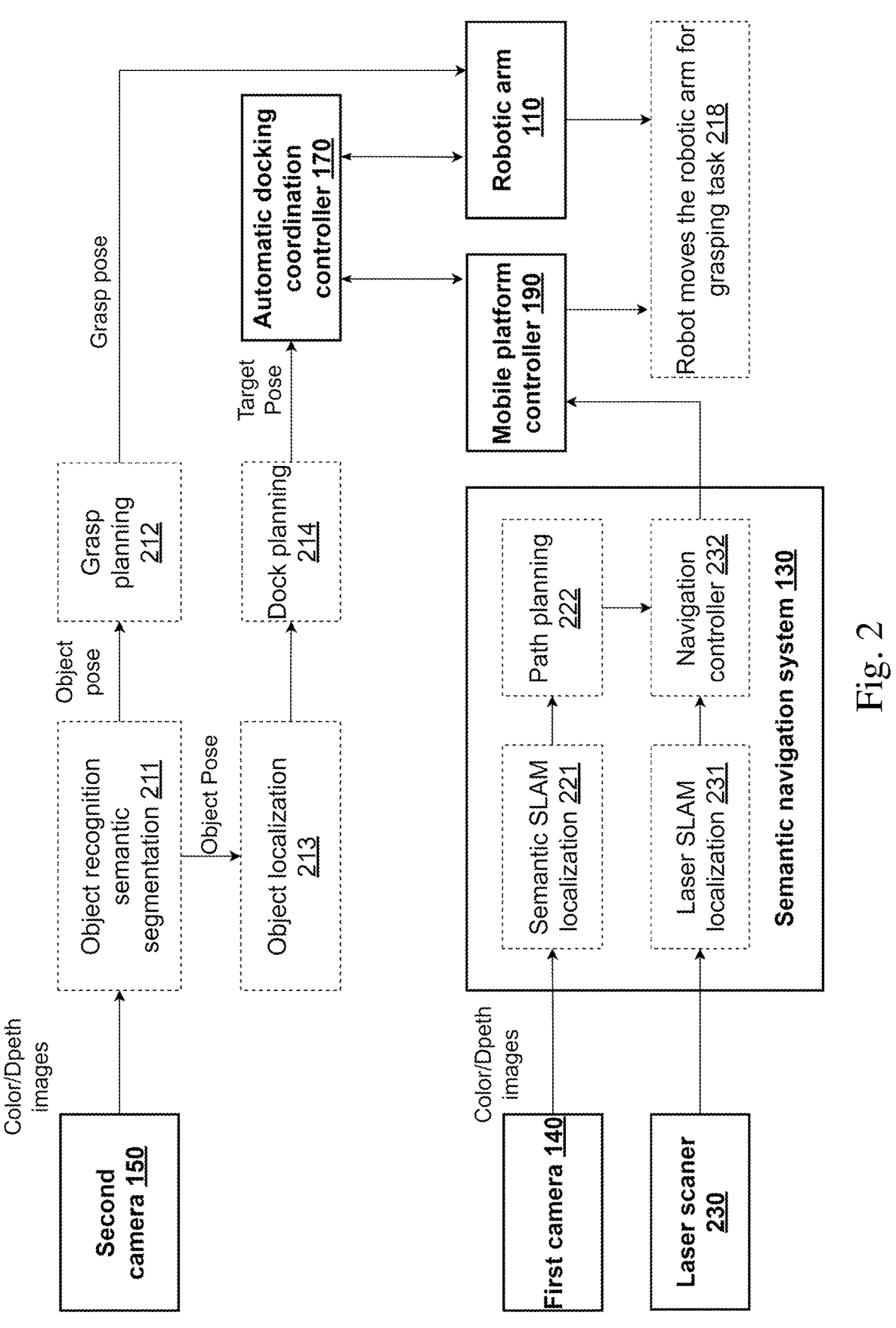
FIG. 2 is a system architecture diagram of a robotic arm according to an embodiment of the present disclosure.

FIG. 2 is a system architecture diagram of a robotic arm according to an embodiment of the present disclosure. In FIG. 2, the second camera 150 transmits the captured color (RGB) images and the depth images to the object recognition and pose estimation system 160 for object recognition and semantic segmentation in box 211. In box 211, the object recognition and pose estimation module 160 uses object recognition and pose estimation algorithm to perform real-time semantic segmentation using a lightweight deep learning model, ESPNetv2. The segmented color images and corresponding point cloud information are then fed into another lightweight DenseFusion model for pose estimation. After the robotic arm 110 reaches the grasping position of a target object, the object recognition and pose estimation system 160 performs a secondary pose estimation for the target object. The pose estimation at a closer distance improves the accuracy of the object recognition. The following processing is performed in box 212-214, with the obtained object pose and contour of the target object, the proposed grasp planning algorithm based on the grasp index is utilized to determine a better grasping position for the target object by considering the distance between the grasping position and the target object's centroid, as well as the width of the grasp segment to control the robotic arm 110 for improving the success rate of grasping. At the same time, object positioning is performed through box 213 and station planning processing is performed at box 214 to generate the target posture of the target object and input to an automatic docking coordination controller 170, and an automatic docking coordination controller 170 transmits the processing results to a robotic arm 110 and a mobile platform controller 190. The robot 100 moves the robotic arm 110 to grab the target object in box 218 to improve the efficiency and robustness of the mobile grasping task.

In FIG. 2, the first camera 140 transmits the color image and the depth image to the semantic navigation system 130. The semantic navigation system 130 via boxes 221, 222, 231, and 232, utilizes real-time appearance-based mapping (RTAB-Map for short) combined with the algorithm of object detection to construct a map. In box 221, by leveraging pre-existing semantic map information, the environment understanding of the robotic arm 110 is enhanced and task flexibility is increased. In box 222, once the mobile platform 120 receives the semantic information, the mobile platform 120 performs path planning. With the navigation controller 232 working in conjunction with the mobile platform controller 190, the system autonomously navigates and docks to the target point. The automatic docking coordination controller 170 sends object poses and recognition results to both the mobile platform controller 190 and the robotic arm 110. By employing movement planning algorithm and grasp planning algorithm, the robotic arm 110 and the mobile platform 120 can move simultaneously to improve the efficiency of the grasping process. The mobile platform 120 can dock smoothly in front of the workstation, making it easier to perform the grasping task, and positioning the robotic arm above the target object for gasping the target object in box 218.

Figure 3:
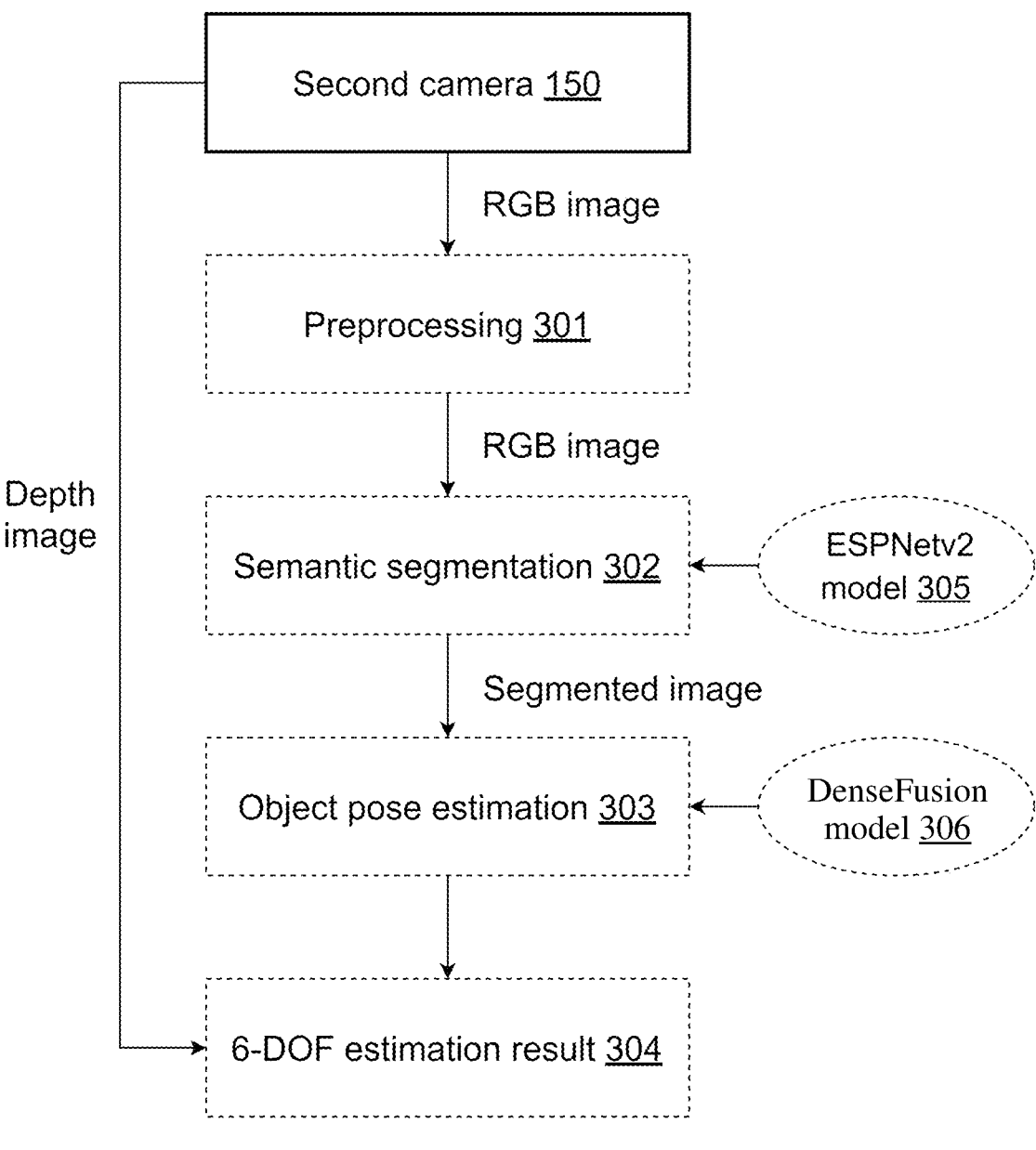
FIG. 3 is an architecture diagram of an object recognition and pose estimation system 160 in FIG. 1 according to an embodiment of the present disclosure.

FIG. 3 is an architecture diagram of an object recognition and pose estimation system 160 in FIG. 1 according to an embodiment of the present disclosure. In box 301, the image preprocessing module 162 performs preprocessing on the input RGB color image to obtain object depth point cloud information. This preprocessing helps reduce the effects of lighting and shadow variations in the environment, thus improving the stability of the object recognition and pose estimation system 160. In box 302, the semantic segmentation module 164 utilizes the ESPNetv2 model 305 to perform semantic segmentation on the preprocessed RGB color image. This segmentation enables pixel-wise localization of the recognized objects. Moving on to box 303, the pose estimation module 166 employs the DenseFusion model 306 to estimate the object's pose by combining the segmented color image from the previous step with the object's depth point cloud information obtained from the second camera 150. In box 304, the 6-DOF pose estimation result of the target object is calculated.

The mobile grasping controller 180 utilizes a grasp planning algorithm based on the known object's appearance contour to design the grasping pose for the robotic arm 110. The core concept is to select a favorable grasping region based on the obtained pose and contour of the target object. A favorable grasping region refers to an area that increases the success rate of grasping, thereby enhancing the stability of grasping known objects. This approach improves the reliability of grasping known objects by selecting the optimal grasping range.

Figure 4A:
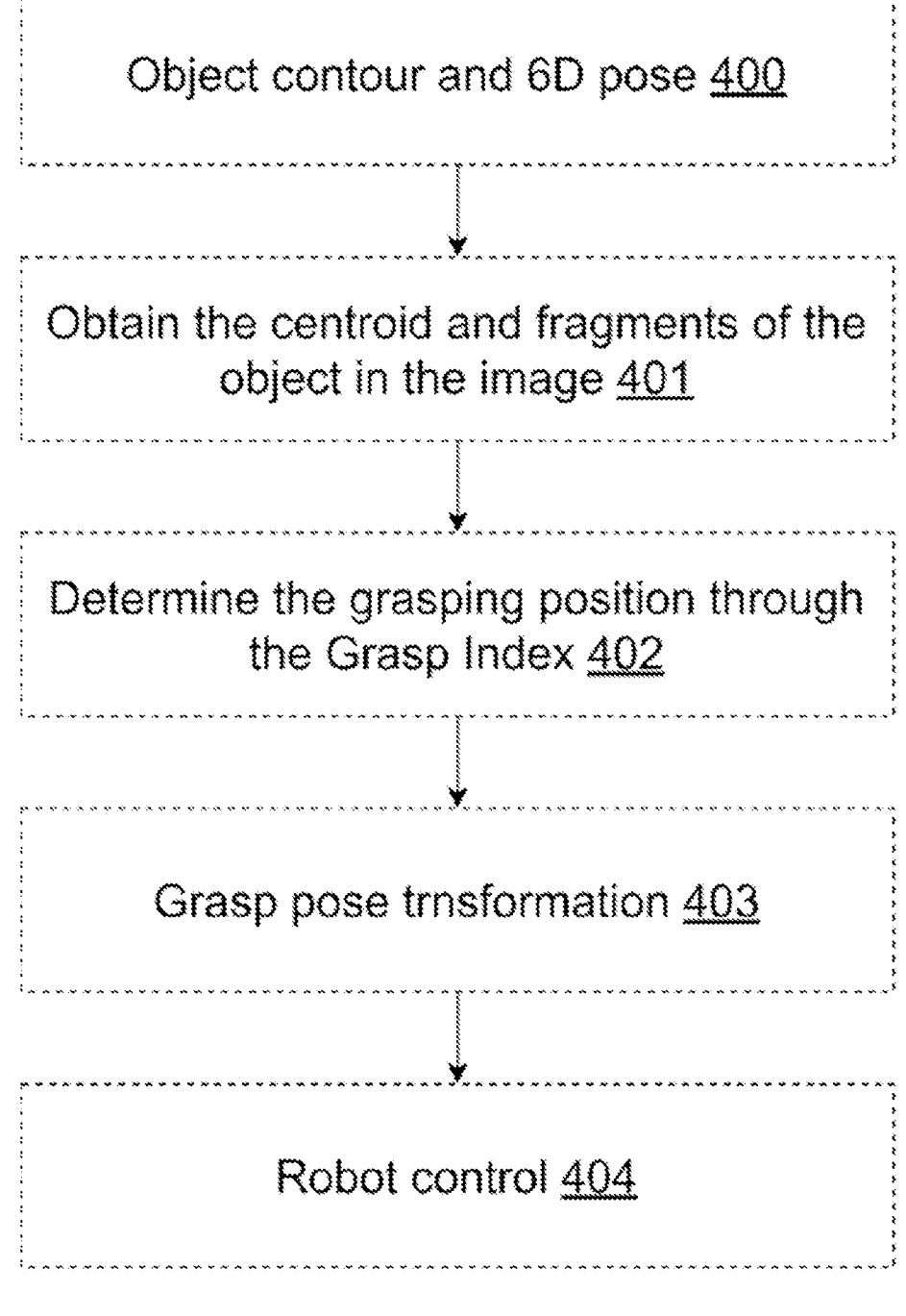
FIG. 4A is a structure diagram of the grasp planning of a robotic arm in box 212 of FIG. 2, according to an embodiment of the present disclosure.

FIG. 4A is an architecture diagram of the grasp planning of a robotic arm in box 212 of FIG. 2, according to an embodiment of the present disclosure. The grasp planning algorithm for the robotic arm includes three parts: centroid and contour segment acquisition, grasp index design, and grasp pose transformation. The first part of the centroid and contour segment acquisition are to transfer the object contour and 6D pose 400 to box 401 to obtain the image object centroid and object slice processing. The centroid and contour segment acquisition are designed to first determine the centroid position of the object and use the centroid position as a reference to evaluate the grasp positions of the target object's contour segments. In box 402, through the design of the grasp index, the grasp positions at various locations of the object are evaluated to select the optimal position for object grasping. Finally, the transformation processing of grab posture coordinates of box 403 is performed. It represents the coordinate transformation relationship for the grasp pose of the robotic arm 110. Since the obtained grasp positions are based on the target object's contour in the image plane, the grasp pose transformation allows the target object grasp information to be transformed from the plane to the three-dimensional space, and then reach the robot control of box 404.

Continue to illustrate the algorithm of the grasping plan of the robotic arm 110 according to FIG. 4A. In the first part, through the acquisition of the centroid and contour fragments, the position of the centroid of the object in the image plane can be understood first; based on this position, through the 3D model of the object and the DenseFusion model combined with the pose estimation algorithm, the orientation of objects is known. The major axis (i.e., longest axis) of the object is defined by the orientation of the object, and the gripper is used to grasp the vertical direction of the long axis. The contour fragments of the object are also segmented according to the direction of the major axis to evaluate the grasping position. In the contour image of the object, the centroid of the object can be calculated through the marking of each pixel on the contour image. The equations are as follows: 3.1-3.4:

$$M_{00} = \sum_X \sum_y v(x, y) \qquad (3.1)$$

$$M_{10} = \sum_X \cdot \sum_y v(x, y)\, x \qquad (3.2)$$

-continued $$M_{01} = \sum_X \cdot \sum_y v(x, y)\, y \qquad (3.3)$$

$$m_x = \frac{M_{10}}{M_{00}}, \, m_y = \frac{M_{01}}{M_{00}} \qquad (3.4)$$

$M_{00}$ is the area of the object, while $M_{10}$ and $M_{01}$ are the moments of inertia of the object on the image plane with respect to the x-axis and y-axis respectively. The centroid $m_x$ and $m_y$ of the object on the image plane can be obtained through calculation.

Figure 4B:
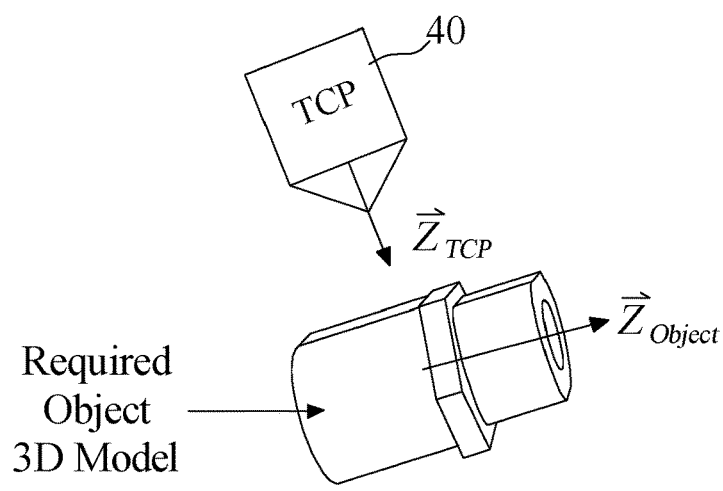
FIG. 4B is a 3D perspective view of a target object to be grasped according to an embodiment of the present disclosure.
Figure 4C:
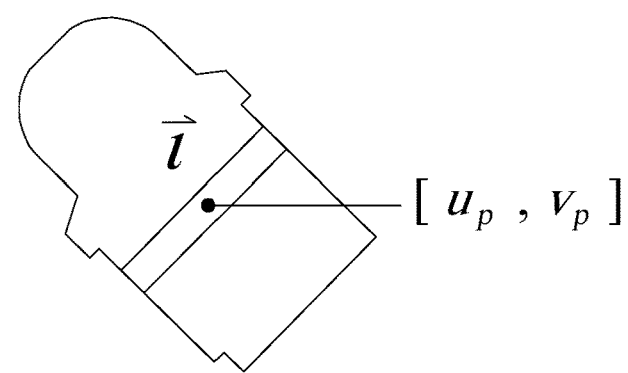
FIG. 4C is a plane view of the target object to be grasped according to an embodiment of the present disclosure.

The design of contour segments of the object involves segmenting based on the direction of the major axis mentioned earlier to evaluate the grasp positions. This is achieved by utilizing the 3D model of the object to determine the positive direction perpendicular to the grasping plane of the object, as shown in FIG. 4B. We define the Z-axis of a gripper 40 as perpendicular to the Z-axis of the object, which represents the direction of the object's major axis, denoted as $R_{Z\_tcp} \perp R_{Z\_obj}$. This perpendicular relationship not only facilitates the gripper 40 in grasping the object more easily but also allows the transformation of the major axis direction into the axial direction in the contour color image of the object. As a result, the width of the segments that are perpendicular to the positive direction of the contour color image can be determined. This is achieved by starting from the centroid and calculating the segment width values at regular intervals of 5% displacement on both sides of the positive axial direction. The resulting contour image and width/are shown in FIG. 4C.

In the second part, the Grasp Index is designed to determine the most appropriate grasping pose. Through the acquisition of the centroid and the contour segment, the understanding of the position of the object can be increased based on the centroid. By utilizing the object's 3D model, the major axis of the object is determined as the positive direction. The widths of the segmented regions obtained from the contour color image are calculated using the grasp index design to increase the success rate of grasping the object of interest. The calculation of the grasp index involves two parameters. Firstly, the distance between the grasp position and the centroid is considered. For object grasping, it is preferred to have the grasp position closer to the centroid. However, the centroid position of the object may not always be an optimal grasping position. In some cases, the centroid may be located at a curved or uneven part of the object. Therefore, the second parameter is the width of the grasp position. A smaller grasp width provides more stability during grasping. The grasp index algorithm combines these two parameters, selecting the grasp position that is both close to the centroid and has a smaller width. The object width and the distance to the centroid together form the grasp index (GI) algorithm as shown in Equation 3.5. Subsequently, the grasp index is calculated, and the position with the maximum GI value (the optimum) is selected as the chosen grasp position.

$$GI = (1 - r_i)(l_{max} - l_i) \qquad (3.5)$$

In terms of capturing indicator-related parameters, $r_i$ represents the proportion of the candidate grasping position's distance from the object's centroid. This proportion is measured in percentage units and is used to assess the proximity of the grasping position to the centroid. $l_{max}$ is designed to be the longest width (unit: pixels) in the contour segments of the color image. The length will be compared with other candidate lengths. $l_i$ is width (unit: pixels) of the contour fragment of the color image at the grasping candidate position. By calculating the algorithm, the maximum value of the grasping indicator (GI) is taken on both sides of the centroid as the grasping position.

In the third part, for the robotic arm 110, the grasp planning is based on three-dimensional space. Therefore, it is necessary to perform a transformation of the grasping posture to convert the optimal grasping position planned using grasp indices on the two-dimensional image plane into three-dimensional space coordinates that can be used for grasp planning through inverse kinematics. These coordinates consist of the object's translation and rotation in three-dimensional space. The conversion of the displacement in three-dimensional space is calculated using the pinhole model. This model allows the points of the object on the two-dimensional plane to be projected and transformed into spatial coordinates. As a result, the displacement of the object's grasp position is obtained in the form of $(X_{tcp}, Y_{tcp}, Z_{tcp})$ as shown in Equation 3.6:

$$\begin{cases} X_{tcp} = X_{obj} \cdot (u_p - c_x)/(u_0 - c_x) \\ Y_{tcp} = Y_{obj} \cdot (v_p - c_y)/(v_0 - c_x) \\ Z_{tcp} = Z_{obj} \end{cases} \qquad (3.6)$$

Figure 4D:
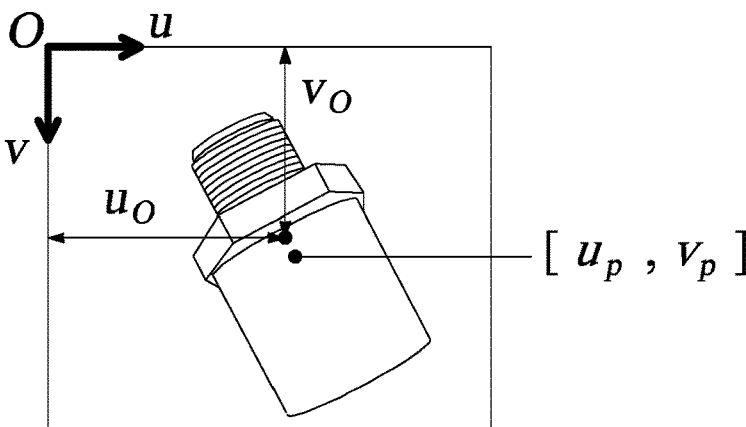
FIG. 4D is a position marking diagram for the target object to be grasped according to an embodiment of the present disclosure.

$X_{obj}$, $Y_{obj}$, and $Z_{obj}$ are the position of the object in the three-dimensional coordinates after pose estimation. $u_0$ and $v_0$ are the center position of the object on the two-dimensional image plane. $u_p$ and $v_p$ are the grasping position calculated by the grasp index of formula (3.5), as shown in FIG. 4D. $c_x$ and $c_y$ are internal references of the first camera 140, respectively representing the x coordinate and y coordinate of the image center.

After obtaining the translation of the object in the three-dimensional space, the next step is to calculate the rotational quantity. By using the 3D model of the object, we can determine that the orientation of the terminal tool should be perpendicular to the positive direction of the object's grasping surface, meaning $R_{Z\_tcp} \perp R_{Z\_obj}$. This perpendicular relationship allows for a more stable grasp. Additionally, on the grasping plane, the grasping position of the claw should be parallel to the calculated contour width, denoted as l, namely $R_{x\_tcp} \| \vec{l}$. The value of $R_{y\_tcp}$ can be obtained through the cross product of the other two rotational amounts. Therefore, after performing the calculations, the rotational amount of the terminal tool in spatial coordinates $(R_{x\_tcp}, R_{y\_tcp}, R_{z\_tcp})$ is given by equation 3.7:

$$\begin{cases} R_{x\_tcp} = \vec{l} \\ R_{y\_tcp} = R_{z\_tcp} \times R_{x\_tcp} \\ R_{z\_tcp} = R_{Z\_obj} \times R_{x\_tcp} \end{cases} \qquad (3.7)$$

After the calculation of the designed grasping pose transformation, the translation $(X_{tcp}, Y_{tcp}, Z_{tcp})$ of the final grasping position of the terminal tool in the three-dimensional space and the rotation amount of the terminal tool $(R_{x\_tcp}, R_{y\_tcp}, R_{z\_tcp})$ can be then calculated from the grasping position of the object in the two-dimensional image plane combined with the 3D model of the grasping object.

The first camera 140, mounted above the robotic arm 110, is used to recognize the object. After estimating the object's pose, the semantic segmentation image and three-dimensional pose of the desired grasping object are obtained. Utilizing a known 3D model, the grasp index can be calculated to determine the optimal grasping position of the desired grasping object in the two-dimensional plane. Then, using a grasp pose transformation method, the two-dimensional grasping position on the plane is transformed into the position of the terminal tool in the three-dimensional space for object grasping.

Figure 5:
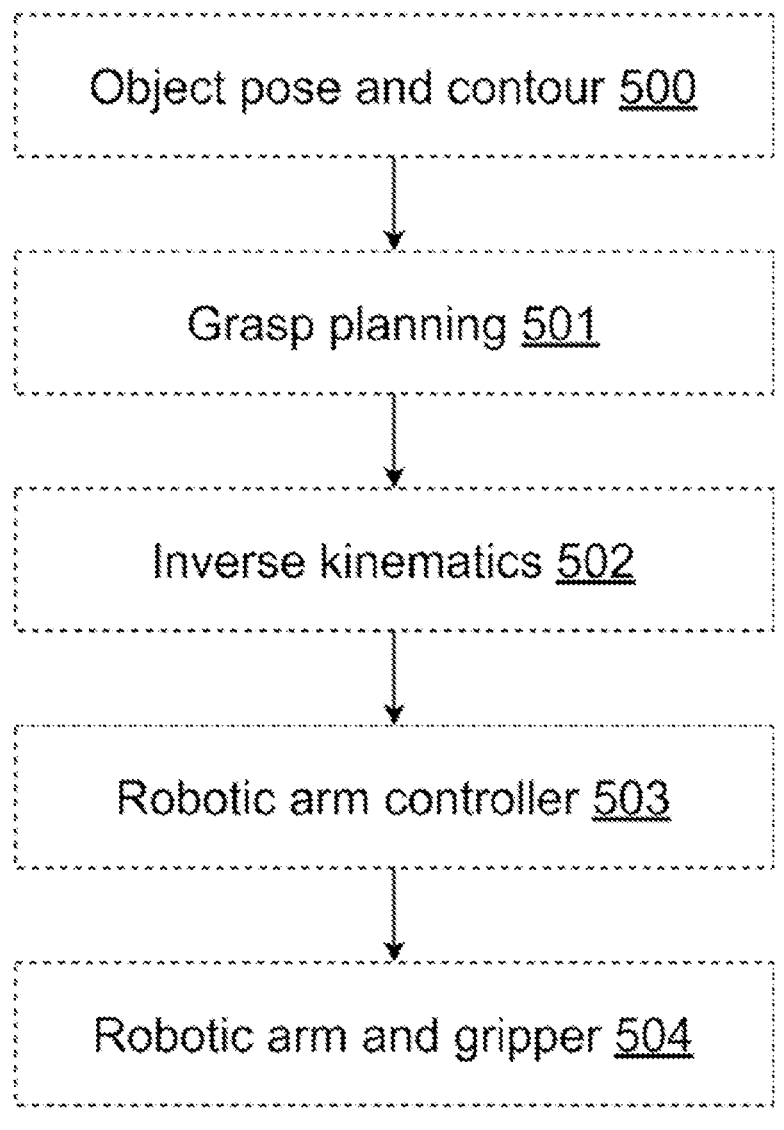
FIG. 5 is a flow chart of the robotic arm for object grasping according to an embodiment of the present disclosure.
Figure 6:
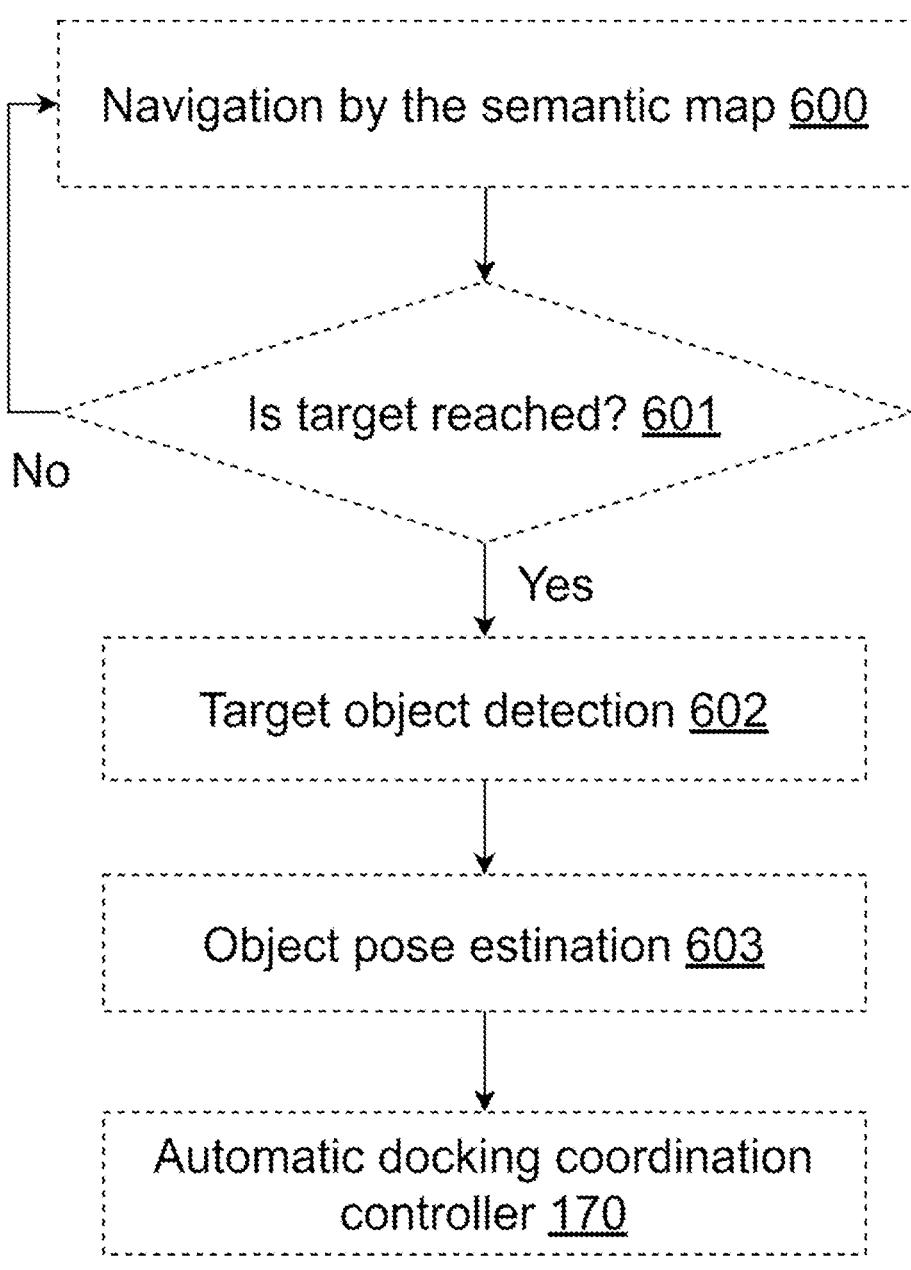
FIG. 6 is a flow chart of robotic arm motion planning according to an embodiment of the present disclosure.

FIG. 5 is a flow chart of the robotic arm for object's grasping according to an embodiment of the present disclosure. Firstly, in step 500, object pose and contour processing are performed, the grasping pose and contour obtained from the object recognition and pose estimation system 160 are used. In step 501, the grasp planning algorithm is applied to determine the optimal grasping position of the terminal tool in space for the object, and the grasping coordinates of the planned terminal tool are obtained. In step 502, inverse kinematics calculations are performed. In step 503, velocity control commands for the six axes of the robotic arm are issued to the robotic arm controller. Finally, in step 504, robotic arm 110 and gripper complete the object grabbing FIG. 6 is a flow chart of robotic arm motion planning according to an embodiment of the present disclosure. Firstly, in step 601, it is determined whether the robot 100 has reached the position of the target object. If not, the process proceeds to step 600, where navigation is performed using the semantic information of the target object located on the semantic map. This allows the robot 100 to be navigated to the target semantic space. Once the robot reaches the target space, the process moves to step 602, where object pose recognition is performed using the second camera 150 on the robotic arm 110. In step 603, secondary motion planning of the robotic arm 110 is carried out based on the results of the object pose recognition. Finally, in step 170, the robotic arm 110 is correctly positioned in front of the target object to be grasped for the grasping operation through automatic docking coordination controller 170.

Due to the robot 100 being a redundant system with infinite possible paths for completing the object grasping task, some paths may pose collision risks or make it difficult to accomplish the grasping task. To address this, the automatic docking coordination controller 170 utilizes position-based visual serving with closed-loop optimized velocity control to control the mobile robot. Firstly, the pose error between the current and target terminal tool poses is computed. The mobile grasping controller 180 then generates feasible joint velocities to minimize this error through velocity optimization control. The minimization problem is formulated as a constrained optimization problem, where the constraints are the limits of joint velocities.

Figure 7:
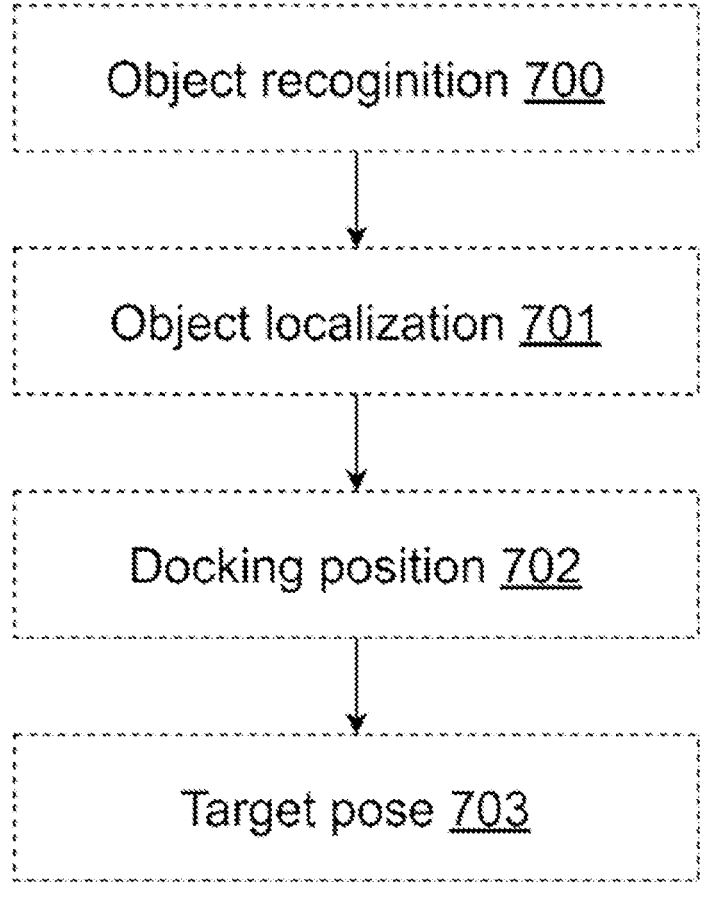
FIG. 7 is a flowchart of the docking position planning of the robot according to an embodiment of the present disclosure.

The mobile platform controller 190 utilizes a docking motion planning algorithm for the mobile platform 120 to avoid collisions between the robotic arm 110 and the docking station, ensuring that the mobile platform 120 docks at a suitable position for grasping objects in a cluttered stack. Considering the elongated shape of the robot 100, in order to successfully complete the grasping task while avoiding collisions with the docking station and improving safety and robustness, a docking position planning process diagram of the robot 100, as shown in FIG. 7, is proposed. Firstly, in step 700, object recognition is performed using the second camera 150 positioned above the robotic arm 110, through the object recognition and pose estimation module 102. In step 701, the pose estimation module 166 estimates the three-dimensional pose of the object, and through the transformation relationship of the robotic arm 110, the object's position can be mapped onto a two-dimensional map. In step 702, the representation of the object's pose in the two-dimensional map is given by equation (4.1):

$$T_{map}^{object} = T_{camera}^{object} \cdot T_{base}^{camera} \cdot T_{map}^{base} \qquad (4.1)$$

In this equation, $T_{camera}{}^{object}$ represents the coordinate transformation of the grasping object based on the camera's coordinate system, which can be obtained through the pose estimation module 166. The known coordinate transformation between the camera and the base is denoted as $T_{base}{}^{camera}$. Additionally, the semantic navigation system 130 of the robotic arm 110 provides the positional relationship of the robotic arm 110 on the map, denoted as $T_{map}{}^{base}$. By performing matrix multiplication, $T_{map}{}^{object}$ can be obtained, representing the corresponding position between the object and the map.

Please continue to refer to FIG. 7. In step 702, after identifying the position of the object on the map, the object's coordinates can be described using the map coordinate system. This allows the mobile platform 120 to align parallel to the x-axis of the object's position on the map and have the same x-coordinate as the object. The y-coordinate of the mobile platform 120 is determined to be 80 centimeters beside the object. The determination of the docking position of the mobile platform 120 can be represented by equation (4.2):

$$\begin{cases} X_b = X_o \\ Y_b = Y_o + 0.8 \\ \theta_b = 0 \end{cases} \qquad (4.2)$$

In this equation, $X_b$, $Y_b$, $\theta_b$ represent the docking position of the mobile platform 120 in the map coordinates, while $X_o$, $Y_o$ represent the position of the object on the docking station, determined using equation (4.1). By using these variables, the docking position of the mobile platform 120 can be determined based on the position of the object on the docking station.

Please continue to refer to FIG. 7. In step 703, through the semantic segmentation and recognition algorithm of the semantic segmentation module 164, the result of object pose estimation is obtained. $T_{obj}$ and $R_{obj}$ represent the translation and rotation of the object, respectively. By combining the docking position of the mobile platform 120, $X_b$ and $Y_b$, the position of the object at the docking station can be determined. The transformation relationship is shown in equation (4.3).

$$T_{base\_goal}^{object} = T_{camera}^{object} \cdot T_{base}^{camera} \cdot T_{base\_goal}^{base} \qquad (4.3)$$

In this equation, $T_{base\_goal}{}^{base}$ represents the relationship between the position of the mobile platform 120 and the docking position, and $T_{base\_goal}{}^{object}$ represents the relationship between the docking position and the object above. By combining the docking position of the mobile platform 120 and the target pose of the robotic arm 110, the target poses $P_{target}$ and $R_{target}$ are obtained. $P_{target}$ represents the position of the mobile platform 120 ($X_b$, $Y_b$, $\theta_b$) and the displacement of the final target pose of the robotic arm 110 ($T_{tcp}$). $R_{target}$ represents the rotation angle ($R_{tcp}$) of the robotic arm 110 when it reaches the target point.

Figure 8:
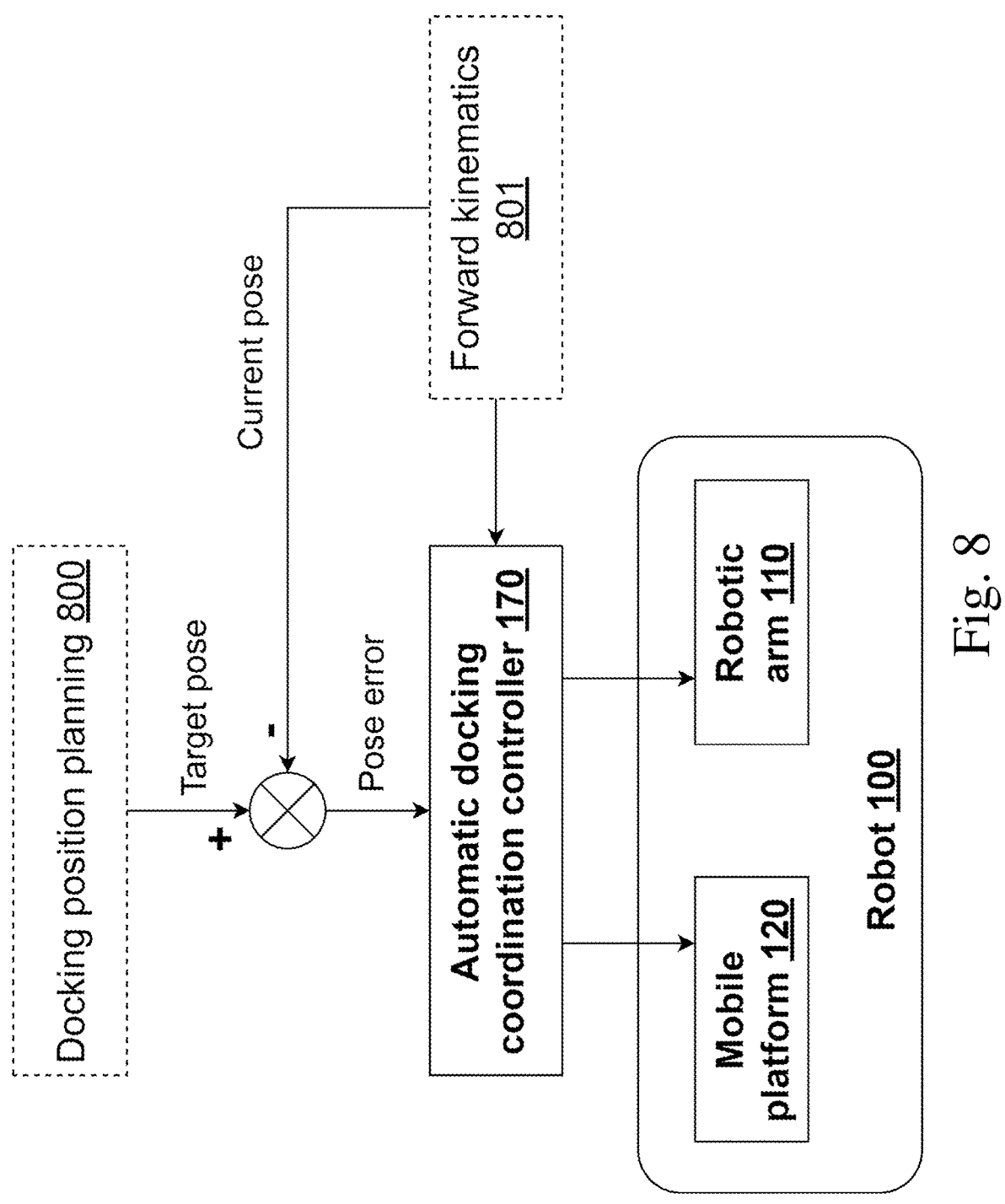
FIG. 8 is an architecture diagram of a mobile grasping motion control system according to an embodiment of the present disclosure.

FIG. 8 is an architecture diagram of a mobile grasping motion control system according to an embodiment of the present disclosure. In terms of the docking position planning in box 800, the combination of the object recognition and pose estimation system 160 and the grasp planning algorithm enables the robotic arm to obtain the desired terminal tool grasp pose for the target object (forward kinematics in box 801). After obtaining the 6-DOF pose of the terminal tool gripper, the pose error between the gripper's pose and the target terminal tool pose is calculated. The automatic docking coordination controller 170 is then used to move the gripper to a suitable pose for grasping. Due to the joint limitations of the robot 100, respectively control both the robotic arm 110 and the mobile platform 120 can simultaneously adjust their motions through the automatic docking coordination controller 170 to eliminate this error and autonomously move to the appropriate position for grasping.

The automatic docking coordination controller 170 is based on the terminal tool velocity error in Cartesian coordinates for control. First, the terminal tool velocity V is described, and the current calculation of the terminal tool velocity is given by equation (4.4).

$$V = \begin{bmatrix} v_x \\ v_y \\ v_z \\ \omega_x \\ \omega_y \\ \omega_z \end{bmatrix} = \begin{bmatrix} -\dot{b}_\theta y \\ \dot{b}_\theta x \\ 0 \\ 0 \\ 0 \\ 0 \end{bmatrix} + J(\theta)\dot{\theta} + \begin{bmatrix} \dot{b}_x \\ \dot{b}_y \\ 0 \\ 0 \\ 0 \\ \dot{b}_\theta \end{bmatrix} \tag{4.4}$$

In this equation, $v_x$, $v_y$, and $v_z$ represent the linear velocities of the terminal tool. $\omega_x$, $\omega_y$, and $\omega_z$ represent the angular velocities of the terminal tool, and y represent the projections of the terminal tool on the X-Y plane. $\dot{b}_x$, $\dot{b}_y$, and $\dot{b}_\theta$ be represent the velocities of the moving platform 120, $(\theta)$ is the Jacobian matrix. $(\theta)$ is the Jacobian matrix. $\theta$ represents the axial velocities of the robotic arm 110 along its axes.

The docking position of the integration of the moving platform 120 and the target pose of the robotic arm 110, along with the calculation of the ideal velocity $V_r$ for the robotic arm 110, can be expressed as follows in Equation (4.5).

$$V_r = \frac{1}{\Delta t} \begin{bmatrix} P_{target} - P_{current} \\ \log(R_{target}R_{current}^T) \end{bmatrix} \tag{4.5}$$

In this equation, $P_{current}$ represents the position of the mobile platform 200 and the robotic arm 110, and $R_{current}$ represents the rotation angle of the robotic arm 110. $P_{target}$ and $R_{target}$ respectively represent the desired docking position of the moving platform 120 and the target grasping point of the robotic arm 110 in terms of position and rotation angle. At is the sampling time used in the optimization of the automatic docking coordination controller 170. The design of the ideal velocity is aimed at reaching the target position within a single sampling time. The velocity control is achieved by considering the position difference between the target and the robotic arm 110, represented as $P_{target} - P_{current}$, as well as the angle difference between the target and the robotic arm 110, represented as $\log(R_{current}^T)$. As the position and angle differences gradually decrease, approaching the target position, the velocity will decrease accordingly, allowing for a smooth docking process at the target position.

In order to meet the requirements of the docking design for the moving platform 120, an optimization algorithm is employed in the optimized automatic docking coordination controller 170. The objective of this optimization algorithm is to minimize the problem and ensure that the robotic arm 110 and the moving platform 120 can successfully complete the docking process and perform the grasping task. Wherein the objective of the optimization method is to have the minimum value of the penalty function as the best solution, as shown in (4.6):

$$\text{Minimize } \|V_r - V\|^2 + P(\dot{\theta}) + W(\dot{\theta}, \dot{b}_x, \dot{b}_y, \dot{b}_\theta) \tag{4.6}$$

$$\begin{cases} \dot{\theta}^{Min} \leq \dot{\theta} \leq \dot{\theta}^{Max} \\ \dot{b}^{Min} \leq (\dot{b}_x, \dot{b}_y, \dot{b}_\theta) \leq \dot{b}^{Max} \end{cases}$$

In this equation, $V_r$ and V the desired velocity and joint velocities of the robotic arm 110, respectively. $P(\dot{\theta})$ is a logarithmic barrier function. $W(\dot{\theta}, \dot{b}_x, \dot{b}_y, \dot{b}_\theta)$ is a first-order normalized function. $\dot{\theta}^*$ is the angle of each axis of the robotic arm 110, limited between $\dot{\theta}^{Min}$ and $\dot{e}^{Max}$. $\dot{b}_x$, $\dot{b}_y$, and $\dot{b}_\theta$ are the linear velocity and angular velocity of the mobile platform 200, limited between $\dot{b}^{Min}$ and $\dot{b}^{Max}$. The first term Minimize $\|V_r - V\|^2$ aims to reduce the velocity error between the actual velocity V and the desired velocity $V_r$ of the robotic arm 110. Minimizing this error helps achieve the goal of reaching the target terminal tool pose within a single sampling time while adjusting the velocity of the terminal tool under the constraints of velocity and joint angle limits, bringing the robotic arm 110 and the mobile platform 120 of the robot 100 closer to the desired velocity. The use of quadratic error of the actual velocity V and the desired velocity $V_r$ as a cost function enables faster convergence of the error. However, the robot 100 has many hardware limitations, such as the maximum range of motion for each axis of the robotic arm 110 and the hardware limitations of the moving platform 120. Therefore, additional penalty functions are introduced. $P(\dot{\theta})$ is a logarithmic barrier function (log barrier function) used to prevent the angles on the axes from approaching their limit. $W(\dot{\theta}, \dot{b}_x, \dot{b}_y, \dot{b}_\theta)$ is a first-order normalized function that assigns different weights to each axis and the moving platform 120 to balance their motions.

FIG. 9 is a flow chart of a method of autonomously grasping objects according to an embodiment of the present disclosure. First, in step 900, the first camera 140 captures the external environment and transmits the captured image to the semantic navigation system 130. In step 910, the robot 100 autonomously navigates to the location of the target object using the semantic navigation system 130 in conjunction with the first camera 140 and the mobile platform controller 190. In step 920, the automatic docking coordination controller 170, with the aid of an optimization algorithm, adjusts the velocity control of the redundant degrees of freedom based on the current positions of the robotic arm 110 and the mobile platform 120 relative to the target positions. This enables simultaneous coordinated motion of the mobile platform 120 and the robotic arm 110, allowing the robotic arm 110 to move to a position above the target object for grasping, while ensuring optimal docking of the mobile platform 120. In step 930, the mobile platform 120 uses the second camera 150 to capture images of the stacked objects on the working table from a top-down perspective. In step 940, the robotic arm 110 receives the object images obtained from the second camera 150. Then, in step 950, the object poses are recognized separately using the semantic segmentation module 164 and the pose estimation module 166, which employ the ESPNetV2 and DenseFusion models, respectively. In step 960, the grasp planning algorithm derived from the mobile grasping controller 180 computes a better grasp position for the object to improve the success rate of grasping. Finally, in step 970, the mobile grasping controller 180 controls the robotic arm 110 to perform the object grasping.

To sum up, the present disclosure enables the robotic arm to autonomously complete the task of grasping in the environment of daily life. The present disclosure combines semantic information to enable the robot to understand the environment, and through object posture estimation and grasping planning and design to improve the success rate of grasping, and combined with the mobile grasping controller, the posture of the robot arm and the mobile platform can reach the grasping position at the same time, so as to complete the grasping efficiently.

What is claimed is:

1. A robot for autonomously moving and grasping objects, comprising:

a robotic arm for grasping a target object;

a mobile platform carrying the robotic arm for moving the robotic arm to a location of the target object to be grasped;

a semantic navigation system electrically connected to the mobile platform for navigating the mobile platform to the location of the target object;

a first camera electrically connected to the semantic navigation system for shooting an external environment during navigation;

a second camera for obtaining relative images of the external environment for the robotic arm;

an object recognition and pose estimation system electrically connected to the robotic arm and the second camera for performing semantic recognition and segmentation as well as pose estimation of the target object to control the robotic arm's grasping of the target object through the second camera; wherein the object recognition and pose estimation system is configured to acquire a centroid and contour fragments of the target object to determine a centroid position of the target object in an image plane, and based on the centroid position, to generate a grasp index and perform pose estimation using a DenseFusion model, thereby selecting an optimal grasping position according to the grasp index;

an automatic docking coordination controller electrically connected to the robotic arm and the mobile platform for obtaining the best mobile grasping path and pose for both the robotic arm and the mobile platform through the object recognition and pose estimation system and based on the Cartesian-coordinate terminal tool velocity error, and coordinates the synchronized movement of the robotic arm and the mobile platform through velocity optimization control and penalty functions for performing the grasping operation;

a mobile grasping controller electrically connected to the robotic arm for controlling the movement of the robotic arm through the object recognition and pose estimation system to enable the robotic arm to perform grasping according to the grasp index; and a mobile platform controller electrically connected to the mobile platform for controlling the motion of the robot.

2. The robot of claim 1, wherein the object recognition and pose estimation system further comprises:

an image preprocessing module for processing the images shoot by the second camera, serving as the preprocessing for depth images;

a semantic segmentation module electrically connected to the preprocessing module for performing semantic segmentation on preprocessed RGB images; and a pose estimation module electrically connected to both the image preprocessing module and the semantic segmentation module for estimating the pose and calculating the six degrees of freedom (6DOF) pose estimation results of objects after image preprocessing and semantic segmentation.

3. The robot of claim 1, wherein the first camera is a depth camera that provides high-quality synchronous video with both color and depth information.

4. The robot of claim 1, wherein the second camera is an eye-in-hand visual depth camera.

5. The robot of claim 1, wherein the semantic navigation system pre-builds a semantic map, allowing the robotic arm to reach the location of the target object through the semantic map.

6. A method of autonomously grasping objects, comprising:

capturing an external environment and transmitting to a semantic navigation system by a first camera;

using the semantic navigation system, cooperated with the first camera, to autonomously navigate a robot to a location of a target object by a mobile platform;

providing an automatic docking coordination controller to perform velocity optimization control and penalty functions based on the Cartesian-coordinate terminal tool velocity error, and coordinate the synchronized movement of the robotic arm and the mobile platform with an algorithm to enable the mobile platform to dock at the best position;

capturing a top-down view of the stacked objects on a workbench, where the target object is located, by a second camera;

receiving an image of the target object, obtained by the second camera, by a robotic arm;

separately calculating to recognize the pose of the target object by a semantic segmentation module and a pose estimation module, wherein the object recognition and pose estimation system is configured to acquire a centroid and contour fragments of the target object to determine a centroid position of the target object in an image plane, and based on the centroid position, to perform pose estimation using a DenseFusion mode;

calculating a better grasp position of the target object, based on a grasp index that evaluates positions according to proximity to the target object's centroid and absence of occlusion, by a grasp planning algorithm generated from a mobile grasping controller, thereby selecting an optimal grasping position according to the grasp index; and controlling the robotic arm to perform object grasping based on the grasp planning algorithm by the mobile grasping controller.

7. The method of claim 6, wherein the automatic docking coordination controller performs optimization speed control of redundant degrees of freedom based on the difference between the current position and the target position of the robotic arm and the mobile platform, enabling the mobile platform to automatically coordinate and control the motion of the mobile base and the robotic arm to simultaneously move to the grasping position above the target object.

8. The method of claim 6, wherein the semantic segmentation module utilizes the ESPNetV2 model, while the pose estimation module employs the DenseFusion model.

* * * * *